(12) United States Patent
Happ et al.

(10) Patent No.: US 6,698,677 B1
(45) Date of Patent: Mar. 2, 2004

(54) RESTRAINT PRETENSIONER

(75) Inventors: Michael J. Happ, Anaheim Hills, CA (US); Daniel H. Meggs, Las Vegas, NV (US); Eric Kawabata, Orange, CA (US)

(73) Assignee: H. Koch & Sons Co., Inc., Anaheim, CA (US)

( * ) Notice: Subject to any disclaimer, the term of this patent is extended or adjusted under 35 U.S.C. 154(b) by 0 days.

(21) Appl. No.: 10/292,370

(22) Filed: Nov. 12, 2002

(51) Int. Cl.7 ............................................... B65H 75/48
(52) U.S. Cl. ........................ 242/374; 280/806; 297/476; 297/478
(58) Field of Search .................. 242/374; 280/806, 280/807; 297/478, 475–476

(56) References Cited

U.S. PATENT DOCUMENTS

| | | | |
|---|---|---|---|
| 3,077,324 A | * 2/1963 | Strickland, Jr. ......... | 244/122 B |
| 3,386,683 A | 6/1968 | Howland ................. | 242/107.4 |
| 3,522,918 A | * 8/1970 | Wrighton ................ | 244/122 R |
| 5,397,075 A | 3/1995 | Behr ..................... | 242/374 |
| 5,443,222 A | 8/1995 | Modinger et al. ......... | 242/374 |
| 5,553,890 A | 9/1996 | Buhr et al. .............. | 280/860 |
| 5,641,131 A | 6/1997 | Schmid et al. ............ | 242/374 |
| 5,699,976 A | 12/1997 | Hori ..................... | 242/374 |
| 5,842,344 A | 12/1998 | Schmid .................. | 60/632 |
| 5,906,327 A | 5/1999 | Chamings ............... | 242/374 |
| 6,089,492 A | 7/2000 | Nagata et al. ............ | 242/374 |
| 6,155,512 A | * 12/2000 | Specht et al. ............. | 242/374 |

* cited by examiner

*Primary Examiner*—Kathy Matecki
*Assistant Examiner*—Sang Kim
(74) *Attorney, Agent, or Firm*—Edgar W. Averill, Jr.

(57) ABSTRACT

A pretensioner for tightening an occupant restraint, such as a seatbelt, against an occupant on a vehicle. The pretensioner has a locking reel which is activated when a signal is sent by a crash sensing device. When such signal is sent, the pretensioner causes a rack to turn a pinion, which is attached to a reel which tightens the occupant restraint. The pinion is allowed to turn freely by holding the rack out of its sphere of movement until the piston, which controls the position of the rack, is caused to extend. The pinion turns a shaft which is connected to a locking reel through a connector which is movable between a connected configuration and a disconnected configuration.

17 Claims, 3 Drawing Sheets

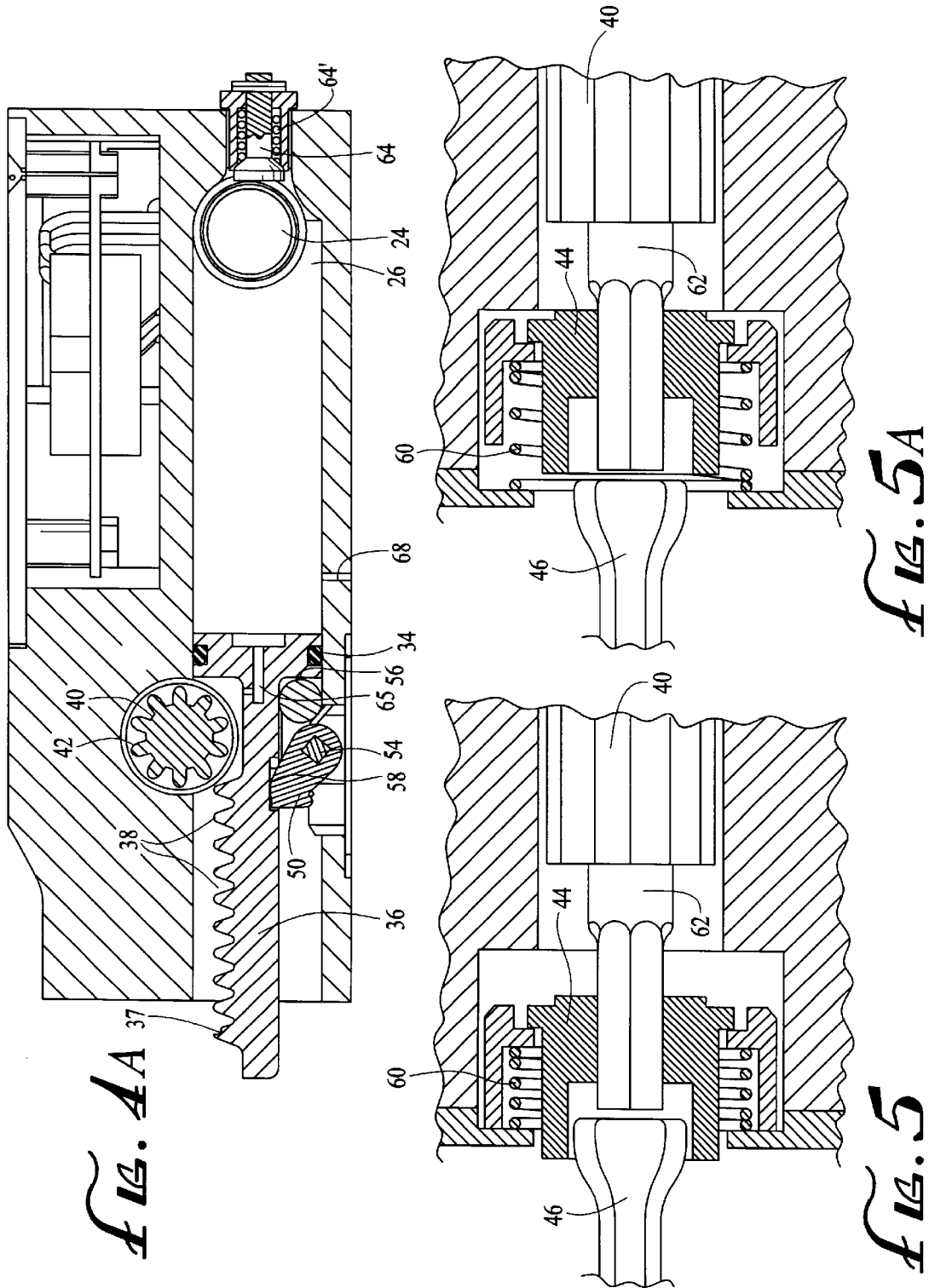

RESTRAINT PRETENSIONER

BACKGROUND OF THE INVENTION

The field of the invention is occupant restraint systems for use in vehicles. It is especially adapted for use in fast moving vehicles, such as aircraft or race cars. Such vehicles can subject the occupants to large accelerations/decelerations during unexpected, undesirable events, such as a violent maneuver or a crash. These accelerations/decelerations can lead to large displacements of the occupant's body, which can result in the occupant's body or head contacting structure or objects within the vehicle. This can result in serious injuries or possibly death. Specially designed seats and restraint systems are typically used to restrain the occupant, however, excessive body displacement can still occur during the undesirable events due to the wide range of human body types and sizes.

Restraint systems include inertia reels that are designed to prevent movement of the body during normal operation of the vehicle—such as reaching with the arms and turning of the torso. The inertia reels are also designed to lock (preclude webbing payout from the housing) when large accelerations or decelerations are detected. This minimizes the displacement of the seated occupant's body to mitigate the potential for injury. Furthermore, the seated occupant is sometimes out of position or engaged in reaching or turning motions during the onset of an undesirable event. Even a securely restrained occupant seated firmly against the seatbelt with the restraint and inertia reel functioning perfectly, can still experience significant displacement (depending upon the severity of the event) and be seriously injured due to initial slack in the restraint, the compaction of the webbing on the inertia reel shaft, and induced stretch of the webbing material.

The device set forth below is intended to automatically retract the restraint webbing early in the event. By doing so, undesirable slack is removed and after the webbing is tightened, the occupant is held in the ideal upright seated posture, thereby minimizing the potential for serious injury. The device may be mounted directly to an existing inertia reel in the case of a retrofit, or configured as an integral feature of the inertia reel itself. Furthermore, the device is designed so that actuation will not injure the occupant it is intended to protect and ensure a safe exit from the vehicle after a crash. Also, non-crash, inadvertant actuation will not inhibit the occupant's ability to continue to safely operate the vehicle, which is particularly crucial in aviation applications.

Although the initial application is in aviation vehicles, the device is also applicable to land vehicles where fast actuation is desired due to the severity of potential undesirable events (e.g. crashes involving high speed racing vehicles).

BRIEF SUMMARY OF THE INVENTION

The present invention is for a pretensioner for tightening a restraint, such as a seatbelt, against an occupant upon the occurrence of a crash or other potential injury-causing acceleration or deceleration. The pretensioner has a locking reel to tighten the restraint when a signal directing such tightening is received. The pretensioner has a housing body with a cylinder having a rack with a piston end. The rack is held within the cylinder and includes an elongated arm having a piston at one end and a shaft extending toward a rack end of the cylinder. The shaft has a rack formed along a portion thereof and the rack is longitudinally movable within the cylinder. A pressure chamber is formed in the pretensioner body at the piston end of the cylinder. Means are provided for aligning the rack in the cylinder so that a longitudinal axis of the rack remains fixed during the movement of the rack. A pinion is held on a pinion shaft rotatably supported by the pretensioner body. The pinion shaft is connectable to the locking reel. A movable rack arm is held in a biased member against the terminus of the rack. This holds the rack so that the piston is nearest the piston end of the cylinder and the rack is out of contact with the pinion. In this way, the pinion can turn freely without contact with the rack until the rack is caused to move by pressure induced into the pressure chamber. The rack preferably has rack teeth along its upper surface and has a flat lower surface which rides on a shaft. As the rack moves, the movable rack arm, which is affixed to a shaft, causes a movable coupler arm to move. The movement of the movable coupler arm permits the release of a coupler, which is positioned between the pinion shaft and the locking reel.

BRIEF DESCRIPTION OF THE DRAWINGS

FIG. 4A is a cross-sectional view analogous to FIG. 4 except showing the rack extended.

FIG. 5 is a cross-sectional view similar to FIG. 3 and showing the intersection of the hex shaft and the drive shaft and showing the drive shaft in a coupled configuration.

FIG. 5A is a cross-sectional view analogous to FIG. 5 with the coupler in an uncoupled configuration.

DESCRIPTION OF THE PREFERRED EMBODIMENTS

Figure 1:
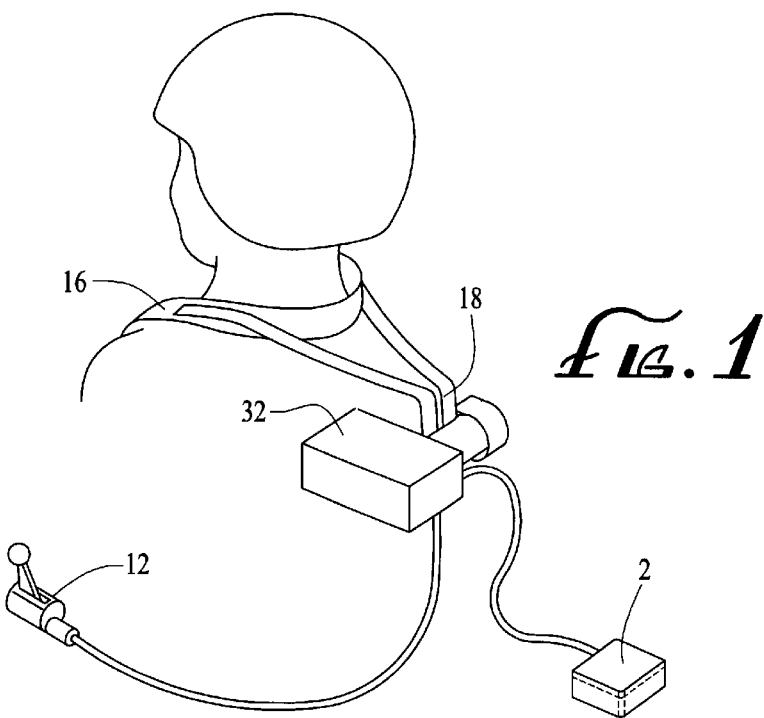
FIG. 1 is a partial perspective view of an air crew man wearing a safety harness that incorporates a webbing which is adapted to be pretensioned by the restraint pretensioner of the present invention.

The general environment in which the restraint pretensioner of the present invention is indicated in FIG. 1. An occupant restraint, which typically includes a harness 16, can be tightened by inertia reel 8 which is rigidly attached to the seat or some other portion of the vehicle structure. The pretensioner 6 may be an integral part of the inertial reel and a crash sensor 2 (similar to the one embodied in U.S. Pat. No. 6,299,102, which is incorporated by reference herein) is rigidly attached to the vehicle structure and located as close as possible to the occupant(s) to ensure accurate sensing of the accelerations (either positive or negative) actually experienced by the occupants.

Figure 2:
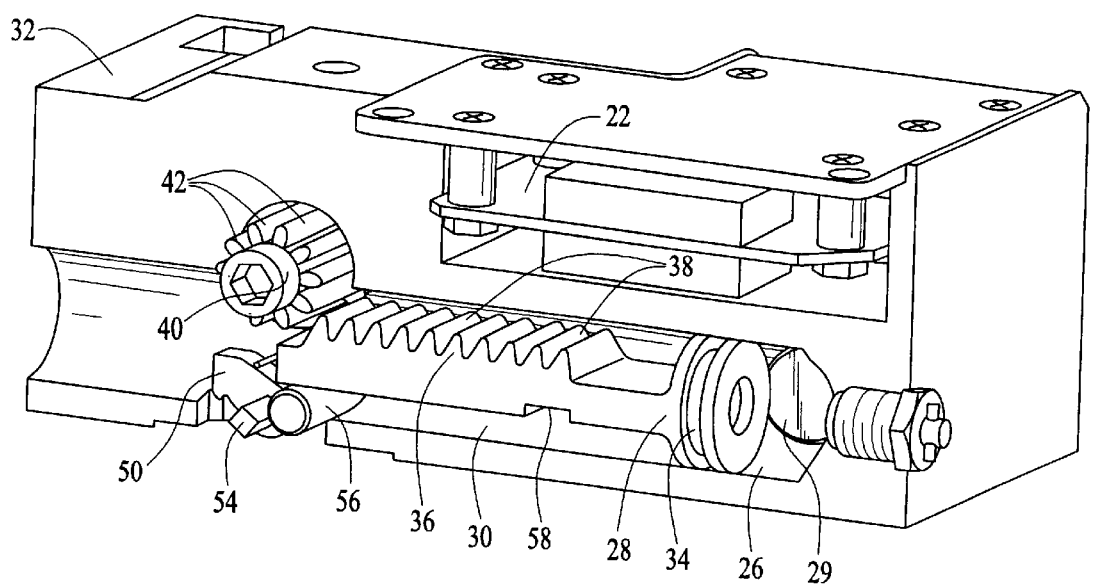
FIG. 2 is a perspective view partly in cross-section of the restraint pretensioner of the present invention taken from the rack side thereof.

Excessive acceleration detected by crash sensor 2 sends an activation signal to pretensioner 6. The activation signal is received by electronic circuit board 22 (shown in FIG. 2) located within pretensioner 6. Electronic circuit board 22 includes, among other components, electrical capacitors where sufficient electrical energy can be stored to initiate a pyrotechnic gas-dispensing cartridge contained within, or attached to, pretensioner 6. Alternatively, such electrical energy can be used to open a valve which allows compressed gas to flow from a separate reservoir. In the embodiment shown in FIG. 2, the stored electricity from such capacitor is delivered to pyro 24 producing gas which flows into chamber 26. The released gas pressurizes chamber 26 almost instantaneously, causing piston 28 to move rapidly within cylindrical hole 30 and housing 32. An o-ring would normally be mounted in o-ring groove 34 in piston 28 to minimize leakage.

Piston 28 is elongated and equipped with an integral rack 36 with teeth 38. As the teeth 38 engage the teeth 42 of pinion gear 40, the linear displacement of piston 28 produces rotation of pinion gear 40. Pinion gear 40 is directly coupled to the inertia reel's webbing shaft 20, shown in FIG. 3, through drive shaft 46 and coupler 44. Rotation of the inertia reel's webbing shaft 20, in turn, forcibly back-drives the occupant restraint webbing 18 on shaft 20, activating the inertia reel's automatic locking feature and maintaining the occupant in the optimum upright seated position to withstand the high acceleration of the event.

Prior to actuation, piston 28 and pinion gear 40 are disengaged—that is, piston 28 is initially prevented from movement by movable rack arm 50, which is held in place by torsion spring 48. Pinion gear 40 is able to rotate freely, as shown best in FIG. 4. As the inertia reel's webbing shaft 20 turns, pinion gear 40 turns freely whenever the webbing 18 is retracted or "paid out." That is, the teeth 38 of rack 36 are not in engagement with the teeth 42 of pinion gear 40 before mechanism actuation. Also the coupler 44 is in the coupled configuration as shown in FIG. 5 prior to actuation and during belt tensioning.

Figure 3:
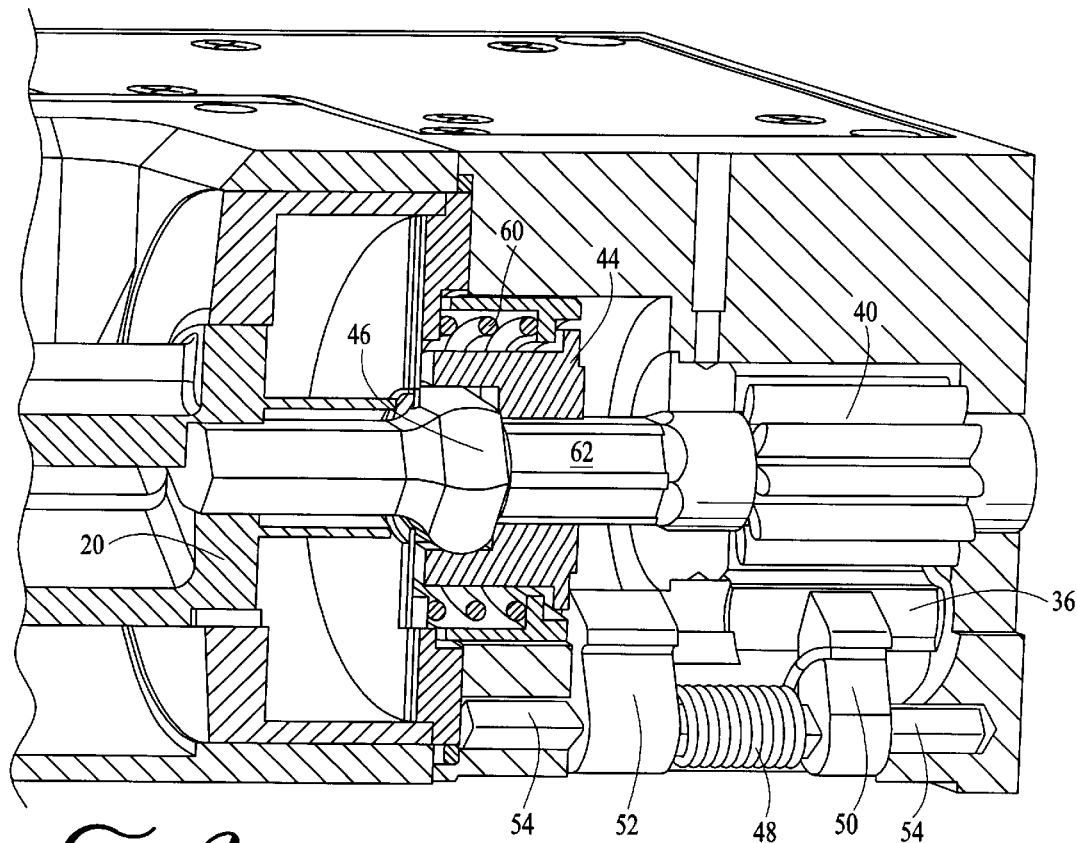
FIG. 3 is a perspective view partly in cross-section taken near the pinion end thereof.

As piston 28 moves linearly, the lower surface of rack 36 is supported by pin 56, which ensures proper alignment of the teeth 38 during engagement with teeth 42. Note that rack 36 is prevented from moving before actuation by movable rack arm 50. Movable rack arm 50 is keyed to and mounted on shaft 54. Furthermore, a movable coupler arm 52 is also keyed to and mounted on shaft 54 and holds coupler 44 in the engaged position, as shown in FIG. 3. The torsion spring 48 prevents shaft 54 from rotating prematurely. Thus, this mechanical sub-system prohibits piston 28 from moving prior to actuation by crash sensor 2. The forced displacement of piston 28 both drives rack 36 and rotates shaft 54, and movable rack arm 50 and movable coupler arm 52. At the end of the stroke, piston 28 is stopped by pin 56 and prevented from rebounding by engagement between movable rack arm 50 and pocket 58 on the underside of piston 28.

Coupler 44 serves several functions: (a) allows for simultaneous axial and radial misalignment between the male hex shaft 62 of pinion gear 40 and drive shaft 46, (b) couples the pinion gear assembly to the webbing shaft 20, and (c) decouples pinion 40 and drive shaft 46 after actuation is finished. The decoupled configuration is shown in FIG. 5A. The input side of coupler 44 engages the output side of male hex shaft 62 of pinion gear 40. The large end of drive shaft 46 is flared and enlarged for strength and engages the output side of coupler 44. The smaller end of drive shaft 46 fits into, is keyed to, and drives webbing shaft 20 of inertia reel 8. Coupler 44 stays engaged to both hex shaft 62 of pinion gear 40 and drive shaft 46, and is constrained from separating by the presence of movable rack arm 50 until actuation is complete. After actuation is complete, the compression spring 60 moves coupler 44 axially away from the flared end of drive shaft 46, disengaging hexagonal drive shaft 46 from webbing shaft 20. The occupant is still confined within the occupant restraint 16 because inertia reel 8 is still locked. After the undesirable event is complete, the occupant can manually unlock the inertia reel via handle 12, regaining complete freedom of movement and/or egress capability.

As an alternative to pyro 24, a compressed gas system can be used. In another embodiment, pretensioner 6 could be equipped with a small pressure intensifier driven by electronic circuit board 22. The pressure intensifier can refill a pressure reservoir after each actuation (opening the release valve) permitting the system to be "recyclable." Recycling the system permits the use of lower actuation thresholds for the crash sensor, allowing system operation in "marginal" events without loss of capability or the primary objective (crash events). The pressure intensifier is a small, reciprocating, piston-type pump which draws in ambient air and forces it into the reservoir until the desired pressure is reached. Subsequent on/off cycles can be used to maintain the reservoir at the desired pressure negating the need for hermetic sealing, which would be particularly difficult for the release valve.

Figure 4:
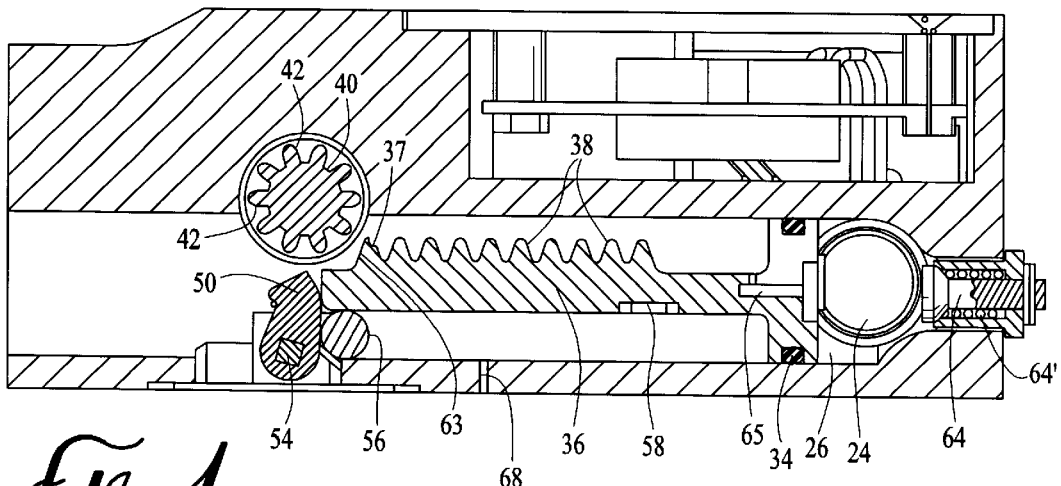
FIG. 4 is a cross-sectional view taken near the rack side thereof.

A critical, additional feature of this design shown in FIG. 4 is that the first tooth 63 of rack 36 is modified from the standard tooth profile by the removal of a portion 37 of the trailing surface. In the rare instance of a precise initial tip alignment of the first tooth 63 with a tooth (teeth 42) of pinion gear 40 (which could prevent the teeth from engaging), this feature ensures that the gear teeth do not lock as engagement is attempted. This could render the device inoperable and potentially trap the seated occupant in the occupant restraint system. In this case, the modified portion of the tooth will shear, allowing the remaining portion to align and complete the tooth engagement sequence. In addition, the tips of all teeth (teeth 38 and teeth 42) are smoothly contoured in order to maximize synchronous and smooth engagement.

A second critical feature of the present design is the addition of a means for venting the post-actuation chamber pressure. After the pretensioning event is completed, the internal gas pressure in chamber 26 can be vented through a spring loaded pressure relief valve 64, shown in FIG. 4. Alternatively, an optional small diameter orifice 65 can be used to relieve the pressure within chamber 26. Venting or relieving the internal pressure effectively eliminates any forces between the teeth of rack 36 and pinion gear 40, which could prohibit coupler 44 from decoupling once the pretensioning event is completed. As the rack is in the process of turning pinion gear 40, torsional friction tends to hold drive shaft 46 in coupler 44. When the rack has fully extended, the pinion gear 40 is free to move and thus any torsional friction is eliminated, decoupling the drive shaft 46 from the male hex shaft 62 of pinion gear 40.

The pressure relief valve 64 is held in an open position by spring 64'. However, once the gas enters chamber 26, this valve 64 is closed rapidly by such gas pressure during the pretensioning event. The pressure set point at which valve opens and closes can be varied using springs having different spring rates. The optional orifice 65 is best placed in the piston 28, such that venting can occur regardless of the amount of linear displacement of piston 28 that has occurred. This feature eliminates the need for orifice 68 in the housing wall, which could possibly tear the o-ring mounted in groove 34 during traversal.

The pretensioner of the present invention is quite small in size and is readily added to or configured to be part of an existing occupant restraint system.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A pretensioner for tightening an occupant restraint, the pretensioner being of the type having a locking reel which is turned to tighten the occupant restraint when provided with a signal directing tightening, said pretensioner comprising:

a turnable occupant restraint shaft, the turning of which activates a tightenable occupant restraint;

a turnable rack driven shaft rotatably supported by a pretensioner body;

a longitudinally movable coupler for longitudinally interconnecting and disconnecting said turnable occupant restraint shaft with said turnable rack driven shaft, said coupler being biased in a direction to disconnect said turnable occupant restraint shaft with said turnable rack driven shaft and said coupler being held in a interconnecting position by a movable coupler arm which moves from a locked position where it locks the coupler in said interconnecting position to an unlocked position wherein it permits said coupler to move to a disconnecting position, said movable coupler arm being moved between its locked to its unlocked position by linear displacement of a rack;

a rack held by said pretensioner body, said rack being movable from a withdrawn position to an extended position when said signal is given to direct a tightening and said rack being configured to move said movable coupler arm when said rack is moved from its withdrawn position to its extended position;

means for moving said rack from its withdrawn position to its extended position and said rack being positioned to turn a pinion gear affixed to said turnable rack driven shaft as it moves from its withdrawn position to its extended position and said rack being configured to permit the turning of said pinion gear when said rack is in its withdrawn position wherein when said signal is given to direct the tightening of the occupant restraint, the rack moves toward its extended position causing the pinion to turn the turnable occupant restraint shaft thereby tightening said occupant restraint, wherein said pinion gear can turn freely without contact of said rack in both extended and withdrawn positions; and furthermore moving said movable coupler arm permitting said coupler to move to a disconnecting position when not held in an interconnecting position by torsional friction so that after the coupler has moved to its disconnecting position, any restriction on the turning of the pinion will not restrict the turning of the turnable occupant restraint shaft.

2. The pretensioner of claim 1 wherein said coupler is connected to said turnable occupant restraint shaft by an intermediate drive shaft.

3. The pretensioner of claim 2 wherein said intermediate drive shaft has a keyed locking reel end which fits in a longitudinally removable and rotatably lockable manner into an opening in said turnable occupant restraint shaft.

4. The pretensioner of claim 2 wherein said intermediate drive shaft has a keyed tightening coupler end which fits in a longitudinally removable and rotatably lockable manner into an opening in said coupler.

5. The pretensioner of claim 1 wherein said movable coupler arm is connected to a lock shaft so that it turns when said lock shaft is turned and a movable rack arm is also connected to said lock shaft so that it turns when the lock shaft turns and said movable rack arm is positioned to be turned when the rack is moved toward its extended position wherein said coupler is unlocked when said rack is moved toward its extended position.

6. The pretensioner of claim 5 wherein said movable rack arm is biased into contact with said rack wherein said rack in the direction of a withdrawn positioned.

7. The pretensioner of claim 6 wherein said rack and said movable rack arm are shaped to interlock when the rack is extended fully to hold the rack in a fully extended position.

8. The pretensioner of claim 7 wherein said rack is shaped to permit the free turning of said pinion when the rack is in its fully extended position.

9. The pretensioner of claim 8 wherein said rack has a notch on an undersurface thereof and said movable rack arm has a terminus shaped to fit into said notch.

10. A pretensioner for tightening an occupant restraint, the pretensioner being of the type having a locking reel to tighten the occupant restraint when provided with a signal directing such tightening, said pretensioner comprising:

a pretensioner body having a cylinder having a piston end and a rack end;

a rack comprising an elongated arm having a piston at one end and a shaft extending toward the rack end of said cylinder, said shaft having teeth formed there along and said rack being longitudinally movable along said cylinder and said rack having an outer terminus;

a pressure chamber formed in said pretensioner body at the piston end of said cylinder;

means for aligning said rack in said cylinder so that a longitudinal axis of said rack remains fixed during the movement of said rack;

a pinion held on a pinion shaft rotatably supported by said pretensioner body, said pinion shaft being connectable to said locking reel;

a movable rack arm held in a biased manner against the terminus of said rack to hold said rack so that the piston is nearest said piston end of said cylinder and said rack is out of contact with said pinion wherein said pinion can turn freely without contact of said rack in both extended and withdrawn positions said rack is caused to move by pressure induced into said pressure chamber.

11. The pretensioner of claim 10 wherein said rack with teeth is formed on an upper surface of said shaft and a lower surface of said shaft is flat.

12. The pretensioner of claim 11 wherein said means for aligning said rack in said cylinder comprises a pin mounted across said cylinder and positioned so that the flat lower surface of said rack rests on said pin.

13. The pretensioner of claim 11 wherein said lower surface of said shaft has a notch formed therein and said movable rack arm has an end portion which locks into said notch when said rack moves to a fully extended position.

14. The pretensioner of claim 10 further including a small air passageway from a shaft side of said piston to a piston side of said piston to relieve pressure in said pressure chamber after the rack has moved to an extended position.

15. The pretensioner of claim 10 wherein said pressure chamber has a pressure relief valve leading between said pressure chamber and an outer surface of said pretensioner body and said pressure relief valve being biased in an open position and configured to move to a closed position when pressure is introduced into said pressure chamber.

16. The pretensioner of claim 10 wherein said movable rack arm is supported by an arm support shaft so that when the movable rack arm is moved, the arm support shaft will move through an arc between a piston retracted position to a piston extended position and wherein said arm support shaft supports a coupler arm which moves through the same arc as the arm support shaft and as it moves from said piston retracted position to said piston extended position it unlocks a coupler, said coupler forming a link between said locking reel and said pinion wherein when said piston moves to an extended position the link between the pinion and the locking reel is opened.

17. The pretensioner of claim 10 wherein said rack has an outermost tooth having a cut formed therein positioned on the trailing side of the outermost tooth, said cut causing the outermost tooth to break away in the event of a lack of a meshing of the rack and the pinion.

\* \* \* \* \*